US007508636B2

(12) United States Patent
Sellier et al.

(10) Patent No.: US 7,508,636 B2
(45) Date of Patent: Mar. 24, 2009

(54) HYBRID CIRCUIT BREAKER DEVICE

(75) Inventors: Pierre Sellier, Eguilles (FR); Ronan Besrest, Marseille (FR); Claudio Zimmermann, Aegerten (CH)

(73) Assignee: Societe Techique Pour l'Energie Atomique Technicatome, Gif sur Yvette (FR)

( * ) Notice: Subject to any disclaimer, the term of this patent is extended or adjusted under 35 U.S.C. 154(b) by 50 days.

(21) Appl. No.: 10/895,456

(22) Filed: Feb. 26, 2004

(65) Prior Publication Data

US 2005/0146814 A1 Jul. 7, 2005

(30) Foreign Application Priority Data

Dec. 5, 2003 (EP) ................................ 03293050

(51) Int. Cl.
*H02H 3/00* (2006.01)
*H02H 7/00* (2006.01)

(52) U.S. Cl. ............................................ 361/8; 361/2

(58) Field of Classification Search .................... 361/2, 361/8
See application file for complete search history.

(56) References Cited

U.S. PATENT DOCUMENTS 4,104,576 A * 8/1978 Frank ........................ 323/210
4,631,621 A * 12/1986 Howell ........................ 361/13
4,644,309 A * 2/1987 Howell ........................ 335/195
4,723,187 A * 2/1988 Howell ........................ 361/13
4,862,313 A * 8/1989 Shirouzu et al. ............ 361/102
5,164,872 A * 11/1992 Howell .......................... 361/3
6,226,163 B1 * 5/2001 Bernhoff et al. ........... 361/93.1
6,760,202 B1 * 7/2004 Meyer et al. .................. 361/2

FOREIGN PATENT DOCUMENTS

DE 10002870 8/2001
EP 1014403 6/2000

* cited by examiner

*Primary Examiner*—Michael J Sherry
*Assistant Examiner*—Lucy Thomas
(74) *Attorney, Agent, or Firm*—Olbon, Spivak, McClelland, Maier & Neustadt, P.C.

(57) ABSTRACT

This invention relates to a circuit breaker device comprising a main branch (1) comprising a mechanical switch element (2) and an auxiliary branch (3) containing a semiconductor breaking cell (4), this auxiliary branch (3) being mounted in parallel with the main branch (1). The main branch (1) comprises a serial switching assistance module (M2) in series with the mechanical switch element (2), comprising a semiconductor breaking cell (5) controllable in opening in parallel with an impedance (Z1). The auxiliary branch (3) comprises a parallel switching assistance module (M4) comprising an impedance (Z2), this impedance (Z2) including at least one capacitor type element (C).

16 Claims, 6 Drawing Sheets

HYBRID CIRCUIT BREAKER DEVICE

TECHNICAL DOMAIN

The present invention relates to the domain of circuit breaker devices, particularly for alternating or direct current electrical networks and electrical systems or equipment in general. These circuit breaker devices that are inserted in an electrical circuit to be protected are provided with a switch element that cuts off the current circulating in the circuit to be protected under abnormal operating conditions, for example in the case of a short circuit occurring in the circuit to be protected.

STATE OF PRIOR ART

Traditionally, circuit breaker devices are mechanical, in other words the only way to cut off the current is to open a mechanical switch element. This type of mechanical switch element comprises two conducting parts making contact that are in mechanical contact when the switch element is closed (normal operation) and that separate mechanically when the switch element is open (abnormal operation in the case of an overcurrent). There is usually one mobile contact and at least one fixed contact in these conducting parts making contact. These mechanical circuit breaker devices have several disadvantages, particularly when high currents pass through them.

The mechanical cutoff results in setting up an electrical arc due to the high energies accumulated in the circuit in which the circuit breaker device is installed and that it protects.

This electric arc degrades firstly the conducting parts making contact by erosion and secondly the medium surrounding the switch element by ionisation. Thus, the current takes a certain time before it is interrupted due to this ionisation. This electrical arc degrades conducting parts making contact and requires restrictive and expensive maintenance operations.

To reduce the damage due to the inevitable electrical arc and to reduce maintenance, conducting parts making contact are placed in a breaking chamber, in other words a chamber filled with a specific medium that might be air, a vacuum, or a particular gas for example sulphur hexafluoride $SF_6$ but this gas will probably be banned in the future for environmental reasons. This specific medium is capable of resisting the overpressure created by the formation of the electric arc and is designed to facilitate its extinction.

This type of circuit breaker device with a mechanical switch element has a high breaking time. The time taken by the mechanical switch element to open is of the order of 1 millisecond, or even several milliseconds.

Another disadvantage is that they are voluminous, the dimensions of the breaking chamber are larger for higher voltages.

Recent progress in power electronics have made it possible to envisage replacing electromechanical breaking by an electronic breaking using power semiconducting components. So-called static circuit breaker devices are under study.

The first systems using power thyristors were developed in low voltage LV (<1 kV).

IGBT (Insulated Gate Bipolar Transistor) based prototypes, and more recently IGCT (Integrated Gate-Commutated Thyristor) based prototypes were then tested for alternating voltages of several kilovolts.

These fully static circuit breaker devices have the advantage of a high breaking speed (less than 1 millisecond), but also have disadvantages specific to semiconducting components. The maximum current that they resist and the maximum voltage that they can maintain are limited. The circuit breaker device cannot be timed because the semiconducting component that is conducting cannot resist the maximum fault current, therefore it is essential to break the current before this destructive value is reached. This breaking is made in less than half an alternation in the case of alternating current.

Circuit breaker devices have Joule effect losses in the conducting state and a cooling device has to be provided. It is also important to include an energy dissipation system at the time of the break.

Therefore the use of "purely static" circuit breaker devices based solely on semiconducting components for voltages of several kilovolts and currents higher than 1 kiloampere is still problematic.

In order to circumvent these difficulties, hybrid circuit breaker devices (mechanical and electronic) that use semiconductors and a mechanical switch element, are currently under development. For example, this type of circuit breaker device is described in patent application WO00/54292.

A circuit breaker device 10 similar to that described in this patent application, although simplified, is shown in FIG. 1. This circuit breaker device 10 is designed to protect an electrical circuit materialised by an electrical line L. The circuit breaker device 10 is installed in series with the circuit L to be protected. The circuit breaker device 10 comprises a main branch 1 in which there is a mechanical switch element 2 and an auxiliary branch 3 installed in parallel with the main branch 1. The auxiliary branch 3 comprises a semiconductor breaking cell 4. This breaking cell 4 comprises a Graetz bridge 40 with four diodes D connected to the terminals of a diagonal of the Graetz bridge 40, at least one semiconductor breaking element 41 installed in parallel with a varistance 42. This breaking element may be a thyristor. This element can be controllable in opening, for example an IGCT type thyristor.

The expression "controllable in opening" means that the semiconductor breaking device opens as soon as an appropriate control is applied to it.

A simple thyristor is not "controllable in opening". It will not open after a control until zero current is reached.

Therefore, the semiconductor breaking element 41 is either in a conducting state (closed) or in a non-conducting state (open), which makes the semiconductor breaking cell conducting (open) or non-conducting (closed).

The semiconductor breaking cell 4 is connected to the main branch 1 at the ends of the other diagonal of the Graetz bridge 40.

During normal operation, the mechanical switch element 2 is closed. Its two conducting parts making contact are in mechanical contact. The semiconductor breaking element 41 is in a non-conducting state. The circuit L to be protected may carry an electric current through the main branch 1 of the circuit breaker device, in other words through the mechanical switch element 2, practically with no Joule effect losses. If an overcurrent appears in the circuit L to be protected and therefore in the main branch 1 of the circuit breaker device, means (not shown) control opening of the mechanical switch element 2 and simultaneously put the semiconductor breaking element 41 into the conducting state. A weak electric arc appears at the conducting parts making contact with the mechanical switch element 2 during their separation. The voltage corresponding to this electrical arc enables the current that circulates in the circuit L to be protected to quickly switch into the auxiliary branch 3 in which the semiconductor breaking cell 4 is conducting.

As soon as the distance between the conducting parts making contact in the mechanical switch element 2 is sufficient for the electrical arc to be extinguished, the semiconductor breaking element 41 in the breaking cell 4 is put into the non-conducting state, which enables final breaking of the current in the circuit L to be protected.

It is organised such that the opening rate of the mechanical switch element 2 is as fast as possible, such that the electrical arc generated between the conducting parts making contact in the mechanical switch element 2 has the lowest possible energy and therefore will not degrade the said parts. However, this electrical arc plays an important role, since the low arc voltage (about 10 Volts) polarises the semiconductor breaking element 41 above its threshold voltage, thus making it change to the conducting state so that the current passes into the auxiliary branch. The control signal is conventionally a pulse applied to the trigger of the thyristor 41 at the time that the mechanical switch element 2 opens.

Therefore this hybrid circuit breaker device 10 solves some of the technical difficulties of purely static circuit breaker devices, but its performances are dependent mainly on the opening rate of the mechanical switch element 2. Studies have shown that there is a physical limit to the increased opening rate of the mechanical switch element when the current and the voltage are increased on a hybrid topology. In order for the mechanical switch element to resist high currents, the contact surface area between the conducting parts making contact has to be increased, which increases the mass of the mobile conducting part and reduces the opening rate. This may then become too low to switch the current quickly into the bypass branch and to produce a low energy arc. Therefore a high current intensity in the main branch brings the same problem of the mechanical circuit breaker that causes degradation of the mechanical contact of the mechanical switch element 2.

At the moment, there are no satisfactory static or hybrid circuit breaker devices, particularly for the case of high voltage high power applications.

PRESENTATION OF THE INVENTION

The purpose of this invention is to propose a hybrid circuit breaker device that does not have the disadvantages mentioned above.

More precisely, one purpose of the invention is to propose a hybrid circuit breaker device comprising a mechanical switch element and a semiconductor breaking element capable of carrying a direct or alternating current and in which there is no electrical arc when the mechanical switch element is open, even if the current is high.

Another purpose of the invention is to propose a hybrid circuit breaker device with low maintenance.

To achieve these purposes, the invention relates more particularly to a circuit breaker device comprising a main branch comprising a mechanical switch element and an auxiliary branch containing a semiconductor breaking cell, this auxiliary branch being mounted in parallel with the main branch. The main branch comprises a serial switching assistance module in series with the mechanical switch element, comprising a semiconductor breaking cell controllable in opening in parallel with an impedance. The auxiliary branch comprises a parallel switching assistance module comprising an impedance, this impedance including at least one capacitor type element.

The impedance of the serial switching assistance module is preferably a varistance.

The semiconductor breaking cell controllable in opening may comprise at least one serial assembly with a diode and an IGCT type thyristor.

If the circuit breaker device is two-directional, the semiconductor breaking cell controllable in opening may comprise two in series assemblies installed head-foot in parallel.

The semiconductor breaking cell in the auxiliary branch may comprise at least one thyristor.

If the circuit breaker device is two-directional, the semiconductor breaking cell in the auxiliary branch may comprise two thyristors mounted head-foot in parallel.

In another embodiment, the breaking cell in the auxiliary branch comprises a thyristor and a Graetz bridge with two diagonals, the thyristor forming a diagonal of the Graetz bridge, the main branch forming the other diagonal of the Graetz bridge.

In this embodiment, the impedance of the parallel switching assistance module may comprise a capacitor in series with the thyristor.

A series inductance may be mounted in series with the capacitor.

In another embodiment, the impedance of the parallel switching assistance module may comprise an assembly formed of a capacitor and a first resistance installed in parallel, this assembly being installed in series with a second resistance and with the semiconductor breaking cell in the auxiliary branch.

A series inductance may be mounted in series with the assembly and the second resistance.

In another embodiment, the parallel switching assistance module may comprise a Graetz bridge with two diagonals, an assembly parallel with the capacitor and a resistance being connected to the terminals of a first diagonal of the Graetz bridge, an auxiliary inductance being connected to the terminals of the other diagonal, one of the terminals of the second diagonal is connected to the semiconductor breaking cell in the auxiliary branch.

A series inductance may be connected between the Graetz bridge and the semiconductor breaking cell in the auxiliary branch.

To be fast, the mechanical switch element may comprise a Thomson type mobile contact with electromagnetic drive.

This invention also relates to a method for triggering a circuit breaker device characterised in this way. It consists of the following, when there is an overcurrent in the main branch:

switching the semiconductor breaking cell controllable in opening of the serial switching assistance module, from a conducting state to a non-conducting state, switching the semiconductor breaking cell in the auxiliary branch, from a non-conducting state to a conducting state, then opening the mechanical switch element that was initially closed, and finally switching the semiconductor breaking cell in the auxiliary branch from the conducting state to the non-conducting state as soon as the current becomes zero.

BRIEF DESCRIPTION OF THE FIGURES

This invention will be better understood after reading the description of example embodiments given purely for information purposes and in no way limititative, with reference to the appended figures, wherein.

Identical, similar or equivalent parts in the different figures described below have the same numeric references so as to facilitate reference to the different figures.

The different parts shown on the figures are not necessarily at the same scale, to make the figures more understandable.

DETAILED PRESENTATION OF PARTICULAR EMBODIMENTS

Figure 1:
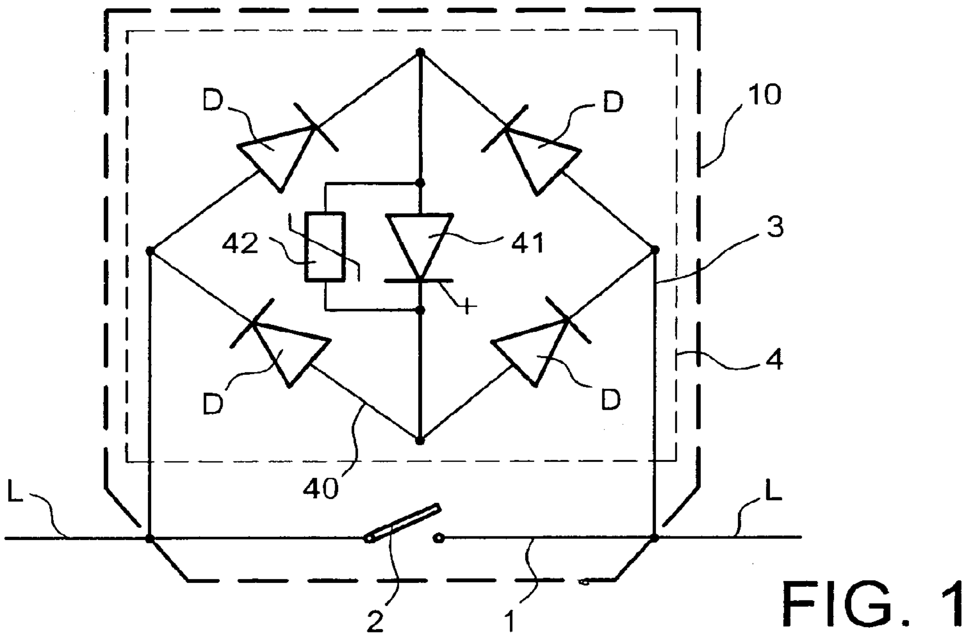
FIG. 1, described above, shows a diagram of a hybrid circuit breaker device according to prior art.
Figure 2:
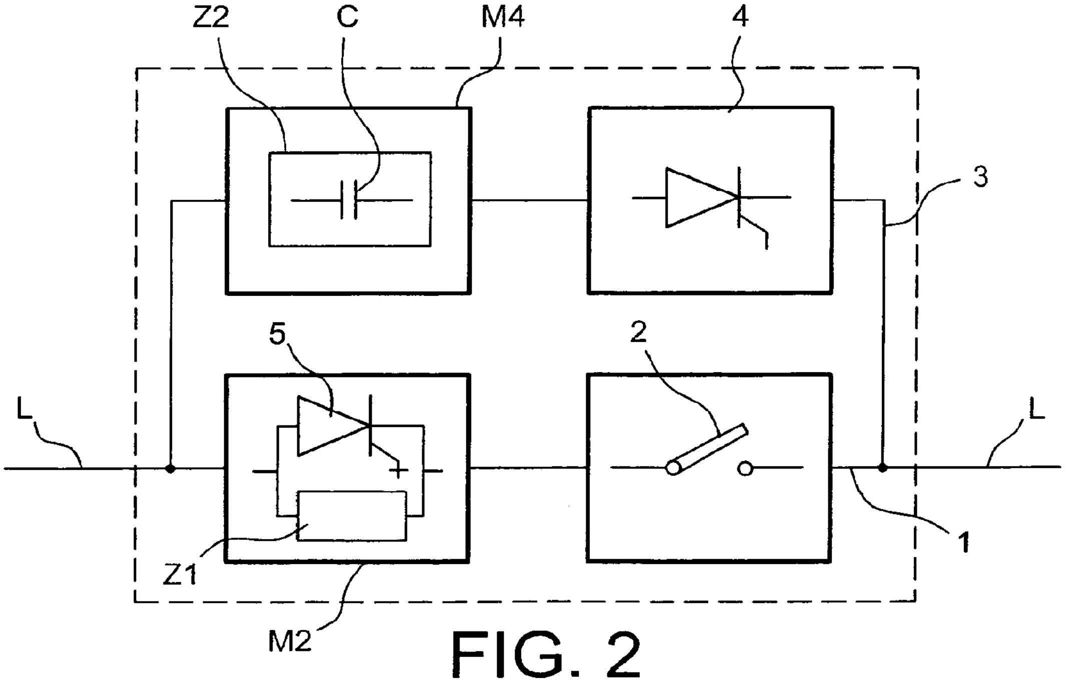
FIG. 2 shows a diagram of a circuit breaker device according to the invention.

We will now refer to FIG. 2 that diagrammatically shows a circuit breaker device according to the invention. As in prior art, this device includes a main branch 1 containing a mechanical switch element 2 and an auxiliary branch 3 installed in parallel with the main branch 1 and containing a semiconductor breaking cell 4. This semiconductor breaking cell is either in a conducting state or in a non-conducting state. Compared with the diagram in FIG. 1, the circuit breaker device according to the invention comprises a serial switching assistance module M2 in the main branch 1 formed from another semiconductor breaking cell controllable in opening 5 installed in parallel with an impedance Z1. The expression. "serial module" is used to indicate that this module is located in the main branch 1. This semiconductor breaking cell controllable in opening 5 is either in a conducting state or in a non-conducting state. The serial switching assistance module M2 is connected in series with the mechanical switch element 2. In addition to the semiconductor breaking cell 4, the auxiliary branch 3 also comprises a parallel switching assistance module M4 formed from an impedance Z2 with at least one capacitor type element C. The expression "parallel module" is used to indicate that the module is in the auxiliary branch 3 in parallel.

The term "impedance" used in this context means a part of the circuit opposing the passage of any current (AC or DC), and this part of the circuit is made from inductance coil and/or capacitor and/or resistance type components.

Preferably, such a circuit breaker device will be two-directional so that it can operate in alternating current, but this is not compulsory, and it could be single directional.

Figure 3A:
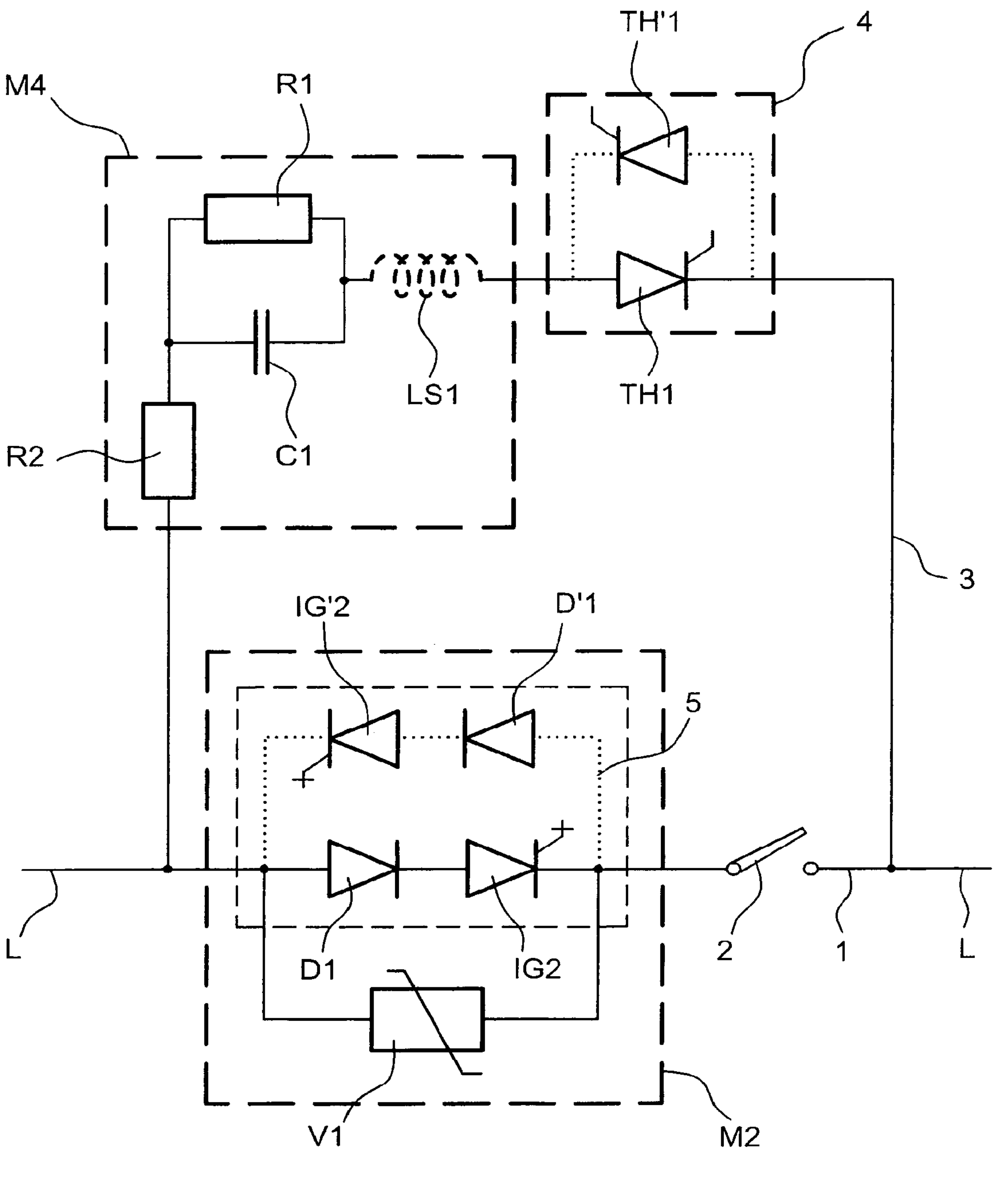
FIGS. 3A and 3B show two embodiments of a circuit breaker device according to the invention, in more detail.

We will now refer to FIG. 3A that shows a first embodiment of a circuit breaker device according to the invention in detail. This circuit breaker device is two-directional, and it is suitable for one phase of an alternating electrical network, or for a direct electrical network. The parts shown in dashed lines are superfluous in a single-directional circuit breaker device.

In the serial switching assistance module M2, the semiconductor breaking cell controllable in opening 5 comprises at least one series assembly formed from a diode D1 and a semiconductor component controllable in opening IG2. Such a component may be an IGCT type thyristor; a conventional thyristor is not suitable because it only opens at zero current. Two series assemblies are used when the circuit breaker device has to be two-directional and in this case the two assemblies are mounted in parallel head to foot. In FIG. 3, the connection of the second assembly IG'2, D'1 is shown in dashed lines to show that the second assembly is optional. This semiconductor breaking cell controllable in opening 5 is installed in parallel with an impedance Z1 that is of the varistance type V1. This varistance may be of the MOV (metal oxide varistance) type and is sized to dissipate energy that in the past would have been dissipated while the electric arc was set up. The assembly consisting of the semiconductor breaking device controllable in opening 5 and the impedance Z1 is connected in series with the mechanical switch element 2. The varistance V1 can resist a voltage only representing a fraction of the network voltage, for example half of it.

Figure 5A:
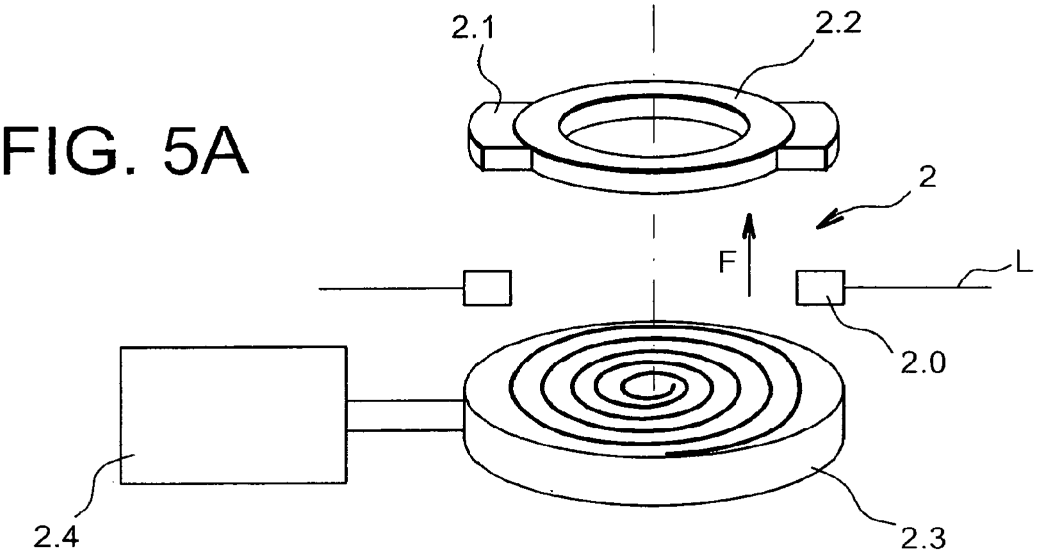
FIG. 5A shows an example of a mechanical switch element in the circuit breaker device and FIG. 5B shows its equivalent circuit.

The mechanical switch element 2 may be based on the use of electromagnetic forces to move a mobile contact 2.1, the purpose being to set up an indexing force skip. An example of a mechanical switch element 2 is illustrated in FIG. 5A. This mechanical switch element is of the Thomson type with no ferromagnetic material. The known principle is based on Lenz's law.

The mobile contact 2.1 is fixed to a mobile part 2.2 made of a non-magnetic conducting material. This part 2.2 cooperates with a propulsion circuit comprising a coil 2.3 that is preferably flat and a power supply circuit 2.4. The choice of the flat coil 2.3 makes it possible to obtain a vertical magnetic field close to the mobile part 2.2. When the coil 2.3 is excited by an intense pulsed current output by the power supply circuit 2.4, a counter current in the reverse direction is initiated in the mobile part 2.2 and due to the interaction between these two currents, a repulsion force F appears between the flat coil 2.3 and the mobile part 2.2. This repulsion force F causes displacement of the mobile part 2.2 that was in an initial rest position. In this initial rest position, the mobile contact 2.1 is in an electrical contact with at least one fixed contact 2.0 (connected to the circuit L to be protected) and the mechanical switch element 2 is closed. The repulsion force F that is applied on the mobile part 2.2 aims to separate the mobile contact 2.1 and the fixed contact 2.0 and therefore to open the mechanical switch element 2. Due to its recessed ring shaped form, the mobile part 2.2 is moved vertically in translation. Consequently, the moving mass and the energy necessary for propulsion is lower than it would be for a solid part, and/or the displacement speed is increased. Other geometries of the mobile part are possible, for example a solid disk. When the coil 2.3 is no longer excited, the mobile part 2.2 returns to its rest position and the switch element 2 is once again closed.

It is possible that the mobile part 2.2 and the mobile contact 2.1 are coincident. In this configuration, the mobile part would for example be made of aluminium coated with silver to also act as an electrical contact.

Figure 5B:
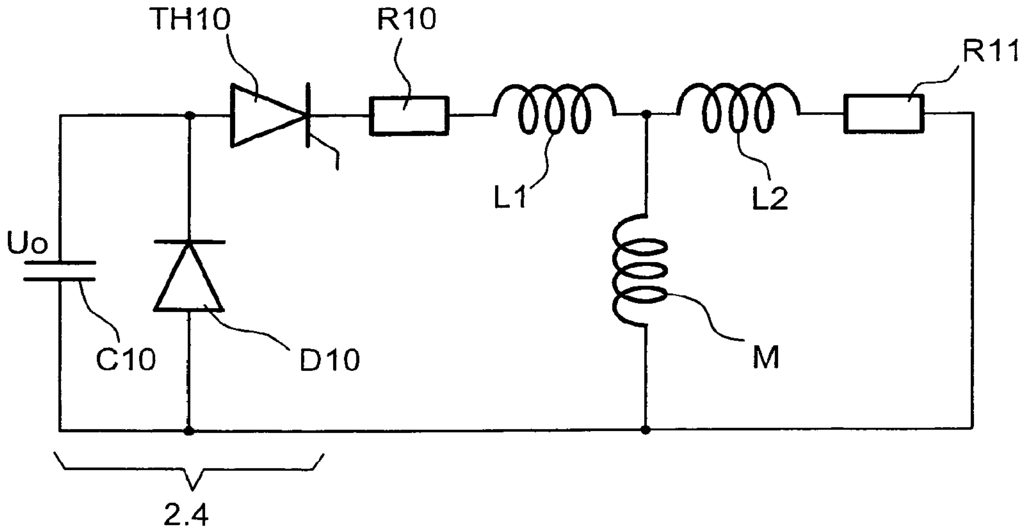

Refer to FIG. 5B that is a circuit equivalent to the propulsion circuit cooperating with the mobile part 2.2 and the power supply circuit 2.4. L1 shows the inductance of the flat coil 2.3, and R10 is its resistance. L2 represents the inductance of the mobile part 2.2 and R11 is its resistance. M represents the mutual inductance between the flat coil 2.3 and the moving part 2.2.

This equivalent circuit is connected to the power supply circuit 2.4 that is formed from at least one capacitor C10 that will be charged to a voltage Uo before a discharge, a diode D10 installed in parallel with the capacitor C10 and a thyristor TH10 inserted between the parallel assembly C10, D10 and the equivalent circuit.

Now refer to FIG. 3A. The semiconductor breaking cell 4 located in the auxiliary branch 3 is formed from two thyristors TH1, TH'1 installed head to foot. One of the thyristors TH'1 may be omitted on a single directional set up.

The parallel switching assistance module M4 is installed in series with the semiconductor breaking cell 4 in the auxiliary branch 3. It comprises a resistance R2 installed in series with a parallel assembly formed from a resistance R1 in parallel with a capacitor C1. The parallel switching assistance module M4 may also comprise a series inductance LS1, in series with the resistance R2 and the parallel assembly R1, C1. This series inductance LS1 limits the current rise rate when the semiconductor breaking cell 4 is made conducting to obtain correct closing even in DC current. The impedance Z2 comprises the capacitor C1, the resistances R1 and R2, and the series inductance LS1.

Figure 3B:
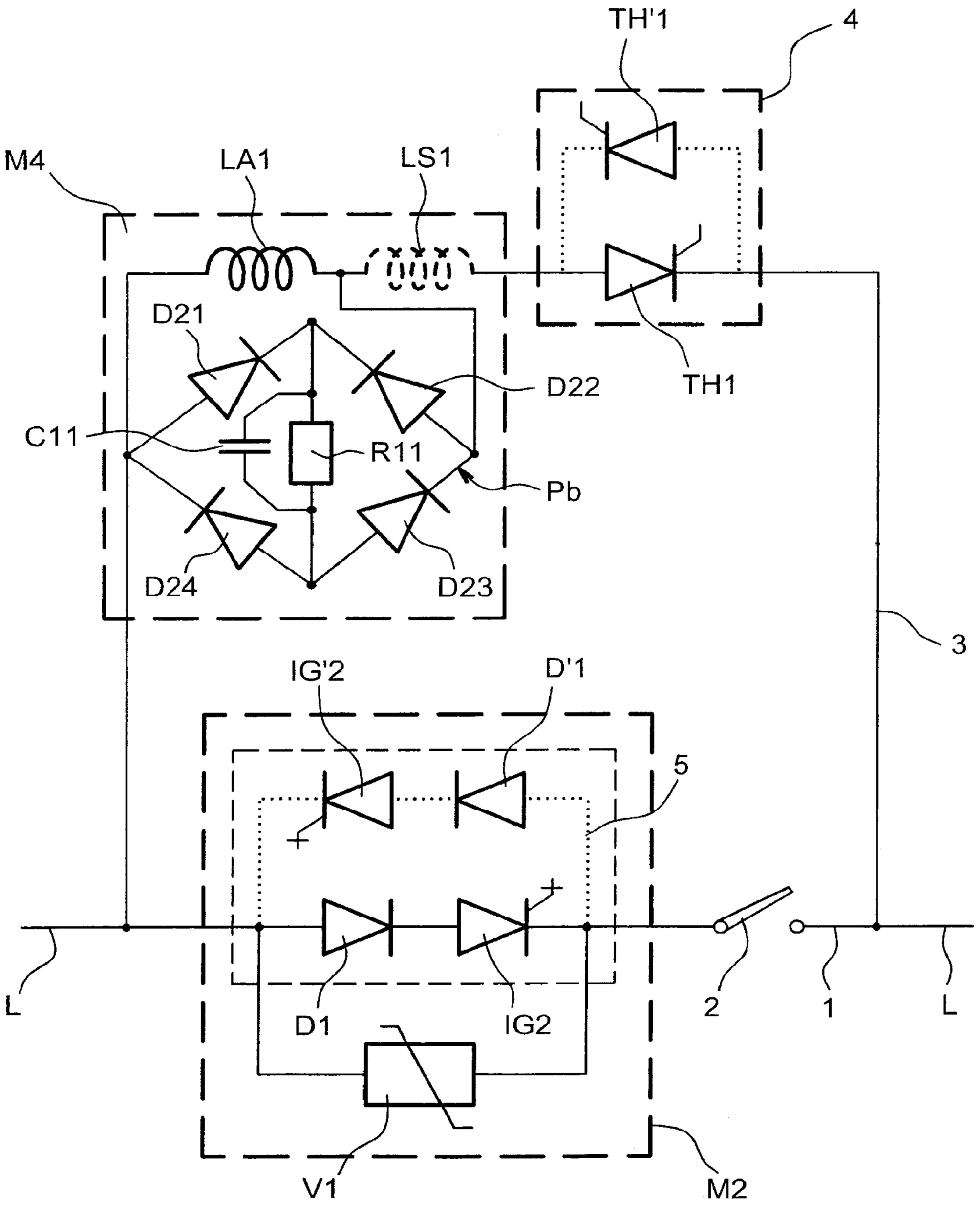

FIG. 3B illustrates another embodiment of a circuit breaker device according to the invention, derived from that in FIG. 3A.

On this diagram, the configuration in the main branch 1 is the same and the configuration for the semiconductor breaking cell 4 in the auxiliary branch 3 is the same. The difference is in the parallel switching assistance module M4. This parallel module M4 comprises a Graetz bridge Pb with four diodes D21 to D24. In a first diagonal of the Graetz bridge Pb, there is a parallel assembly with a capacitor C11 and a resistance R11. An auxiliary inductance LA1 is mounted in parallel with the terminals of the other diagonal on the Graetz bridge Pb.

One of the ends of the second diagonal is connected to the main branch 1. The other end of the second diagonal is connected to the semiconductor breaking cell 4 through the series inductance LS1 (if it is present).

The impedance Z2 comprises the capacitor C11, the resistance R11, the auxiliary inductance LA1 and the series inductance LS1.

Figure 4:
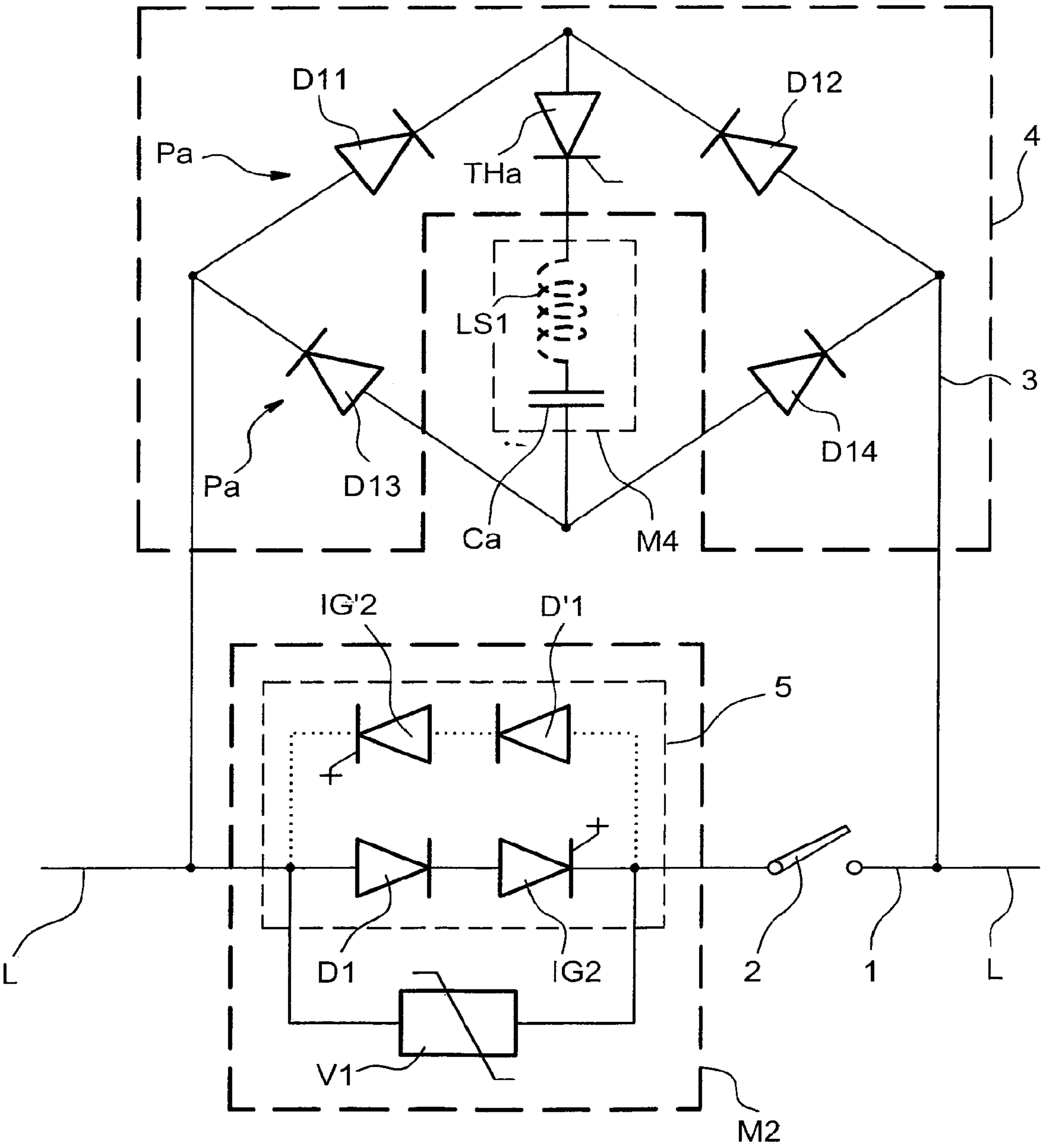
FIG. 4 shows another embodiment of a circuit breaker device according to the invention, in more detail.

FIG. 4 illustrates another embodiment of a circuit breaker device according to the invention. Compared with FIGS. 3A, 3B, there is the same configuration in the main branch 1, in other words the mechanical switch element 2 in series with the serial switching assistance module M2.

In the auxiliary branch 3, the semiconductor breaking cell 4 comprises a Graetz bridge Pa with four diodes D11 to D14, and a thyristor THa mounted in a diagonal of the Graetz bridge Pa. This Graetz bridge Pa is connected to the terminals of the series assembly formed from the serial switching assistance module M2 and the mechanical switch element 2. This connection is made at the ends of the other diagonal of the Graetz bridge Pa. The parallel switching assistance module M4 comprises a capacitor Ca that is connected with the thyristor THa in the diagonal in series. As before, a series inductance LS1 may be inserted between the thyristor THa and the capacitor Ca. The impedance Z2 comprises the capacitor Ca and the series inductance LS1.

In the embodiments described above, the semiconductor components controllable in opening in the main branch 1 may be IGCT type thyristors, simple thyristors are not suitable because opening has to be controlled without waiting for the current to pass to zero.

We will now describe operation of such a circuit breaker device with reference to FIG. 2. In the normal state, in other words when the intensity of the current circulating in the circuit L to be protected is normal, the mechanical switch element 2 is closed and the serial switching assistance module M2 is conducting, in other words the semiconductor breaking cell controllable in opening 5 is in a conducting state. The semiconductor breaking cell 4 in the auxiliary branch 3 is in a non-conducting state. The entire current in the circuit L to be protected passes through the main branch 1 of the circuit breaker device.

In the presence of an overcurrent in the circuit L to be protected and therefore in the main branch 1 of the circuit breaker device according to the invention, the semiconductor breaking cell controllable in opening 5 of the serial switching assistance module M2 changes to a non-conducting state. The voltage at the terminals of the impedance Z1 (varistance V1) increases up to its threshold value. The voltage at the terminals of the serial switching assistance module M2 increases, since the impedance Z1 opposes the passage of current in the main branch 1.

The semiconductor breaking cell 4 in the auxiliary branch 3 becomes conducting. The current circulating in the circuit L to be protected is transferred into the auxiliary branch 3, which acts as a bypass for the energy that would have been dissipated in the semiconductor breaking cell controllable in opening 5 in the main branch 1, at the risk of destroying it.

The current in the mechanical switch element 2 tends towards zero and the voltage at its terminals is null. The mechanical switch element 2 is then open without causing an electrical arc to be set up.

After the mechanical switch element 2 is opened, the voltage at its terminals immediately becomes equal to the voltage that was present at the terminals of the impedance Z2, since the current cancels out in impedance Z1 such that the voltage at its terminals becomes zero. The entire voltage in the auxiliary branch 3 is applied to the mechanical switch element 2 that is open.

The current circulating in the auxiliary branch 3 is limited by the presence of the impedance Z2 that opposes its passage and the maximum value of this current is significantly reduced. The capacitor type element C charges. When the voltage set up at the terminals of the impedance Z2 is sufficient, the semiconductor breaking cell 4 in the auxiliary branch 3 is made non-conducting. The change to the non-conducting state is caused by the current passing to zero in the semiconducting breaking cell 4 in the auxiliary branch 3 In two-directional mode, it is possible to wait for several oscillation alternations of the circuit LC, formed by a parallel switching assistance module M4 and the inductance of the circuit L to be protected, before controlling opening of the thyristor TH1 or TH'1, which introduces a timeout. There is a current limiter function before breaking.

In the final state, the mechanical switch element 2 is open, the semiconductor breaking cell 4 in the auxiliary branch 3 and the semiconductor breaking cell controllable in opening 5 in the serial switching assistance module M2 are in the non-conducting state. Then no more current circulates in the circuit L to be protected and the circuit breaker device has performed its protection role.

The advantage of the variant in FIG. 3B is to form the current limitation function partly by the impedance of the auxiliary inductance LA1. After breaking in the main branch 1 and bypass of the current into the parallel branch 3, part of the current passes through the auxiliary inductance LA1 before final breaking by thyristors TH1, TH'1 in the semiconductor breaking cell 4. This reduces sizing constraints on the capacitor C11 that is used in this case, essentially in its role to transfer current in the main branch 1 towards the parallel branch 3.

With this structure, it is possible to vary the thyristor triggering angle TH1, TH'1. During the conduction phase in the auxiliary inductance LA1, a delayed control of the thyristor triggering angle limits the fault current to the required value. This improves the current limitation function of the circuit breaker before opening.

Figure 6A:
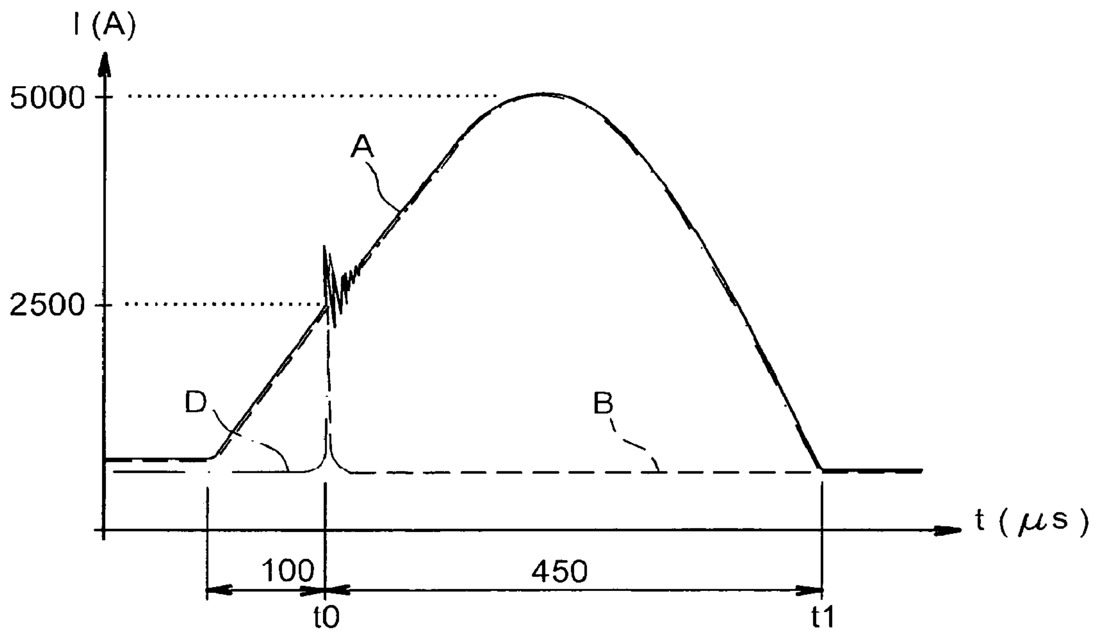
FIGS. 6A and 6B illustrate currents circulating in the circuit breaker device according to the invention, in the mechanical switch element and in the semiconductor breaking cell in the auxiliary branch and the voltage at the terminals of the mechanical switch element in the presence of an overcurrent in the main branch.
Figure 6B:
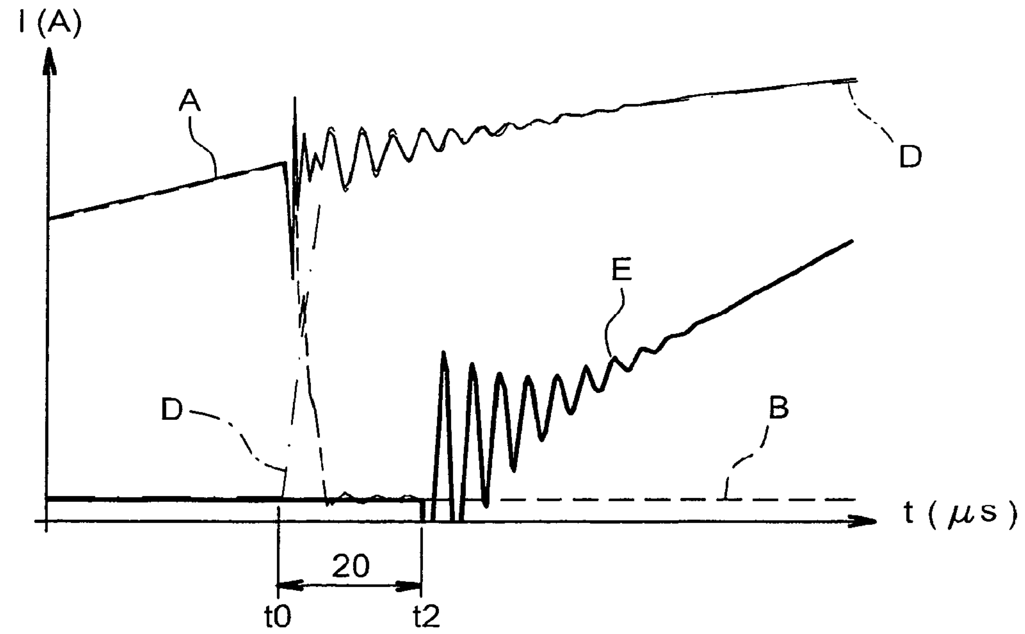

With reference to FIG. 6A, 6B, we will now comment on the curves that simulate the global current A passing through the circuit breaker device, the current B passing through the mechanical switch element 2 and the current D passing through the semiconductor breaking cell 4 in the auxiliary branch 3 at the time that the circuit breaker device opens in the presence of an overcurrent in the circuit L that it protects. Due to this overcurrent, the current B in the mechanical switch element 2 increases until time t0 corresponding to the time at which the semiconductor breaking cell controllable in opening 5 in the serial switching assistance module M2 changes to the non-conducting state. It then reaches a value equal to about 2500 A. The time interval between t0 and the beginning of the current B rise is equal to about 100 microseconds.

The current B in the mechanical switch element 2 changes to zero. This passage to zero takes some time since there is a series inductance LS1 in the parallel switching assistance module M4. At time t0, the current D passing through the semiconductor breaking cell 4 in the auxiliary branch 3 is the current originating from the circuit L that is transferred into the main branch 1. This current D reaches a maximum (about 5000 A) and then decreases due to the presence of the capacitor type element C in the impedance Z2, that charges. The current D ends up by dropping to zero at time t1 and the semiconductor breaking cell 4 in the auxiliary branch 3 is forced to the non-conducting state. The time interval between t0 and t1 is equal to about 450 microseconds.

FIG. 6B is a zoom of FIG. 6A about time t0, and also represents the shape of the voltage E at the terminals of the mechanical switch element 2. This voltage E is zero at the same time as the current B after t0, so that the mechanical switch element 2 opens without causing an electrical arc. This opening takes place at time t2. The time interval between t0 and t2 is equal to about 20 microseconds. The voltage E at the terminals of the mechanical switch element 2 then begins to increase and reaches the voltage that was present at the terminals of the impedance Z2.

The advantages of a circuit breaker device according to the invention are considerable.

Such a circuit breaker device can operate equally well in low voltage A or B as in high voltage A and B. These voltages may be DC or AC voltages.

Such a circuit breaker device has a mechanical switch element that can operate in a normal environment. This means that it can operate without being confined in a breaking chamber in an appropriate gaseous environment or under a vacuum.

Since there is no electrical arc at the time that the mechanical switch element opens, there is no deterioration to the mechanical contact and therefore no severe wear of the conducting parts making contact. Maintenance is lower, and costs are reduced. The reproducibility of opening operations of the mechanical switch element is guaranteed.

It has a high breaking speed due to the presence of semiconductor breaking cells, but does not require a fast mechanical switch element. Therefore there is no new mechanical switch element technology to be developed.

Due to the presence of the semiconductor component controllable when the main branch is open, Joule effect losses in conduction are reduced. A passive cooling device can be used.

This type of circuit breaker device is compact. It is much more compact than devices with breaking chamber configurations.

A timeout is possible in two-directional mode since it is possible that the hybrid circuit breaker device operates for a certain time with its auxiliary branch 3 in conduction, allowing the LC circuit (consisting of the capacitor C, the series inductance LS1 in the parallel switching assistance module M4 and the inductance L of the circuit to be protected) to oscillate before it is cut off by the semiconductor breaking cell 4. During this period, the current is limited by the impedances in the auxiliary branch 3.

If the cutoff takes place when the current is equal to zero, the energy accumulated in the circuit to be protected is zero and energy dissipation is minimized.

Although several embodiments of this invention have been represented and described in detail, it will be understood that different changes and modifications can be made without going outside the scope of the invention.

The invention claimed is:

1. A circuit breaker device comprising:

a main branch including a mechanical switch element; and an auxiliary branch including a semiconductor breaking cell with at least one semiconductor component, said auxiliary branch being mounted in parallel with the main branch, wherein the main branch includes, in series with the mechanical switch element, a serial switching assistance module including a semiconductor breaking cell controllable in opening, said semiconductor breaking cell being connected in parallel with an impedance, and the auxiliary branch includes a parallel switching assistance module including an impedance, said impedance including at least one capacitor element, said parallel switching assistance module being in series with the semiconductor breaking cell, and said parallel switching assistance module being configured to output an alternating current output to the semiconductor breaking cell, in response to an alternating current input during operation.

2. The circuit breaker device according to claim 1, wherein the impedance of the serial switching assistance module is a varistance.

3. The circuit breaker device according to claim 1, wherein the semiconductor breaking cell controllable in opening includes at least one serial assembly with a diode and an IGCT type thyristor.

4. The circuit breaker device according to claim 3, comprising two series assemblies installed head-foot in parallel.

5. The circuit breaker device according to claim 1, wherein the semiconductor breaking cell in the auxiliary branch includes at least one thyristor.

6. The circuit breaker device according to claim 5, wherein the semiconductor breaking cell includes two thyristors mounted head-foot in parallel.

7. The circuit breaker device according to claim 1, wherein the impedance of the parallel switching assistance module includes an assembly formed of a capacitor and a first resistance installed in parallel, said assembly being installed in series with a second resistance and with the semiconductor breaking cell in the auxiliary branch.

8. The circuit breaker device according to claim 7, wherein a series inductance is mounted in series with the assembly and the second resistance.

9. The circuit breaker device according to claim 1, wherein the parallel switching assistance module includes a Graetz bridge with two diagonals, an assembly parallel with the capacitor and a resistance being connected to the terminals of a first diagonal of the Graetz bridge, an auxiliary inductance being connected to the terminals of a second diagonal, one of the terminals of the second diagonal being connected to the semiconductor breaking cell in the auxiliary branch.

10. The circuit breaker device according to claim 9, wherein a series inductance is connected between the Graetz bridge and the semiconductor breaking cell in the auxiliary branch.

11. The circuit breaker device according to claim 1, wherein the mechanical switch element includes a Thomson type mobile contact with electromagnetic drive.

12. The circuit breaker of claim 1, wherein the semiconductor breaking cell in said main branch is configured to suppress electrical arcs occurring at the mechanical switch located in said main branch.

13. The circuit breaker of claim 1, wherein in the absence of a fault, the mechanical switch is closed.

14. The circuit breaker of claim 1, wherein in the absence of a fault, the semiconductor breaking cell is in a conducting state.

15. The circuit breaker of claim 1, wherein, when said mechanical switch is closed, said semiconductor breaking cell is in a conducting state.

16. The circuit breaker of claim 8, wherein the parallel switching assistance module performs a timeout function when the current input to the circuit breaker is an alternating current.

* * * * *

UNITED STATES PATENT AND TRADEMARK OFFICE

CERTIFICATE OF CORRECTION

PATENT NO. : 7,508,636 B2
APPLICATION NO. : 10/895456
DATED : March 24, 2009
INVENTOR(S) : Sellier et al.

It is certified that error appears in the above-identified patent and that said Letters Patent is hereby corrected as shown below:

On the title page, Item (73), the Assignee information is incorrect. Item (73) should read:

-- (73) Assignee: Societe Technique Pour l'Energie Atomique Technicatome, Gif sur Yvette (FR) --

Signed and Sealed this

Nineteenth Day of May, 2009

JOHN DOLL

*Acting Director of the United States Patent and Trademark Office*